United States Patent
Narita et al.

(10) Patent No.: US 12,335,616 B2
(45) Date of Patent: Jun. 17, 2025

(54) IMAGE STABILIZATION CONTROL APPARATUS AND METHOD, IMAGE CAPTURING APPARATUS, IMAGE CAPTURING SYSTEM, AND STORAGE MEDIUM

(71) Applicant: CANON KABUSHIKI KAISHA, Tokyo (JP)

(72) Inventors: Yu Narita, Kanagawa (JP); Ryuichiro Yasuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 18/180,975

(22) Filed: Mar. 9, 2023

(65) Prior Publication Data

US 2023/0300463 A1  Sep. 21, 2023

(30) Foreign Application Priority Data

Mar. 16, 2022  (JP) ................................. 2022-041765

(51) Int. Cl.
*H04N 23/68* (2023.01)
*H04N 23/61* (2023.01)

(52) U.S. Cl.
CPC ......... *H04N 23/6811* (2023.01); *H04N 23/61* (2023.01); *H04N 23/682* (2023.01)

(58) Field of Classification Search
CPC .. H04N 23/6811; H04N 23/61; H04N 23/682; H04N 23/611; H04N 23/68; H04N 23/681; H04N 23/6812; H04N 23/683; H04N 23/6842; H04N 23/685; H04N 23/686; H04N 23/687

See application file for complete search history.

(56) References Cited

U.S. PATENT DOCUMENTS

| | | | | |
|---|---|---|---|---|
| 2016/0316123 | A1* | 10/2016 | Wakamatsu | G06T 7/246 |
| 2016/0316137 | A1* | 10/2016 | Wakamatsu | H04N 23/611 |
| 2017/0163879 | A1* | 6/2017 | Tsuji | H04N 23/687 |
| 2019/0222760 | A1* | 7/2019 | Takeuchi | H04N 23/6815 |
| 2019/0331875 | A1* | 10/2019 | Ikeda | H04N 23/6811 |
| 2020/0344411 | A1* | 10/2020 | Cragg | H04N 23/64 |

FOREIGN PATENT DOCUMENTS

| | | |
|---|---|---|
| JP | 2016-208252 A | 12/2016 |
| JP | 2017-111430 A | 6/2017 |
| JP | 2017-121042 A | 7/2017 |
| JP | 6833483 B2 | 2/2021 |

* cited by examiner

*Primary Examiner* — Albert H Cutler

(74) *Attorney, Agent, or Firm* — Cowan, Liebowitz & Latman, P.C.

(57) ABSTRACT

An image stabilization control apparatus comprises: a first detection unit that detects a subject or subjects in an input image using a learned model and outputs subject information of the detected subject or subjects; a tracking unit that tracks one subject detected by the first detection unit in a plurality of images input consecutively; a reliability calculation unit that calculates reliability of the tracking by the tracking unit based on the subject information; and a first correction amount calculation unit that calculates a first correction amount to be used for image stabilization by adjusting a provisional correction amount which is based on a difference between a position of the subject being tracked by the tracking unit and a predetermined target position in an image, according to the reliability.

17 Claims, 5 Drawing Sheets

| RELIABILITY OF SUBJECT TRACKING<br>SUBJECT INFORMATION | LOWER | HIGHER |
|---|---|---|
| POSITION OF SUBJECT<br>(DISTANCE BETWEEN SUBJECTS) | CLOSER | FARTHER |
| SIZE OF SUBJECT | SMALLER | LARGER |
| TYPE OF SUBJECT<br>(SIMILARITY BETWEEN TYPES OF SUBJECTS) | HIGHER | LOWER |
| NUMBER OF SUBJECTS | LARGER | SMALLER |

IMAGE STABILIZATION CONTROL APPARATUS AND METHOD, IMAGE CAPTURING APPARATUS, IMAGE CAPTURING SYSTEM, AND STORAGE MEDIUM

BACKGROUND OF THE INVENTION

Field of the Invention

The present invention relates to an image stabilization control apparatus and method, image capturing apparatus, image capturing system, and storage medium, and more specifically to technology for subject image stabilization.

Description of the Related Art

Conventionally, an image capturing apparatus such as a digital camera corrects "subject blur" caused by a change in the position of a subject such as a person in addition to "camera shake" of a user holding a camera body.

"Camera shake" can be detected by using an angular velocity sensor attached to an image capturing apparatus or using a motion vector of a stationary subject (for example, background image) between captured images. On the other hand, "subject blur" can be detected by detecting a subject in captured images and measuring the positions of the detected subject in the images.

In this subject detection, there is a problem of erroneous detection in which a subject (hereinafter referred to as a "non-target subject") different from the intended subject (hereinafter referred to as a "target subject") is detected as a target subject. If a non-target subject is erroneously detected as a target subject while an actual target subject is being detected, a phenomenon occurs in which the subject to be detected for finding subject blur is changed to a different subject (hereinafter referred to as "subject transfer").

Japanese Patent No. 6833483 discloses a technique in which template matching is performed between images of consecutive frames using a partial image showing the subject as a template, and the reliability of subject detection is obtained based on the matching result in order to prevent the subject transfer.

In Japanese Patent No. 6833483, the reliability of subject detection is determined based on the distribution of evaluation values (SAD values) obtained by the template matching and the distribution of characteristic colors of the subject area. However, it is difficult to accurately determine the existence of a non-target subject which is similar to the target subject with only the SAD values and the distribution of characteristic colors, and it is difficult to sufficiently suppress erroneous detection of the target subject and the subject transfer.

Further, in the technique disclosed in Japanese Patent No. 6833483, erroneous detection of a subject is determined based on the correlation of luminance and color information between images of a past frame and the current frame, so in a case where a non-target subject is erroneously detected as a target subject in the first frame, erroneous detection cannot be prevented.

On the other hand, in subject image stabilization, it is controlled so that the position of the target subject stably stays near a predetermined position in the image. At that time, if a non-target subject is erroneously detected as the target subject, the position of the actual target subject cannot be stabilized. Also, if the subject transfer occurs, the difference in the position of the target subjects before and after the subject transfer affects the control. As a result, the position of the target subject in the image changes even though the actual target subject has not moved, which causes a problem that the image quality is impaired.

SUMMARY OF THE INVENTION

The present invention has been made in consideration of the above situation, and accurately determines subject detection errors and subject transfer, and perform subject image stabilization processing without impairing image quality.

According to the present invention, provided is an image stabilization control apparatus comprising one or more processors and/or circuitry which function as: a first detection unit that detects a subject or subjects in an input image using a learned model and outputs subject information of the detected subject or subjects; a tracking unit that tracks one subject detected by the first detection unit in a plurality of images input consecutively; a reliability calculation unit that calculates reliability of the tracking by the tracking unit based on the subject information; and a first correction amount calculation unit that calculates a first correction amount to be used for image stabilization by adjusting a provisional correction amount which is based on a difference between a position of the subject being tracked by the tracking unit and a predetermined target position in an image, according to the reliability.

Further, according to the present invention, provided is an image capturing apparatus comprising: an image stabilization control apparatus comprising one or more processors and/or circuitry which function as: a first detection unit that detects a subject or subjects in an input image using a learned model and outputs subject information of the detected subject or subjects; a tracking unit that tracks one subject detected by the first detection unit in a plurality of images input consecutively; a reliability calculation unit that calculates reliability of the tracking by the tracking unit based on the subject information; and a first correction amount calculation unit that calculates a first correction amount to be used for image stabilization by adjusting a provisional correction amount which is based on a difference between a position of the subject being tracked by the tracking unit and a predetermined target position in an image, according to the reliability; an imaging unit; and an optical image stabilization unit that performs optical image stabilization.

Furthermore, according to the present invention, provided is an image capturing system comprising: an image capturing apparatus including an imaging unit and an image stabilization control apparatus comprising one or more processors and/or circuitry which function as: a first detection unit that detects a subject or subjects in an input image using a learned model and outputs subject information of the detected subject or subjects; a tracking unit that tracks one subject detected by the first detection unit in a plurality of images input consecutively; a reliability calculation unit that calculates reliability of the tracking by the tracking unit based on the subject information; and a first correction amount calculation unit that calculates a first correction amount to be used for image stabilization by adjusting a provisional correction amount which is based on a difference between a position of the subject being tracked by the tracking unit and a predetermined target position in an image, according to the reliability; a lens unit detachable from the image capturing apparatus; and an optical image stabilization unit that performs optical image stabilization.

Further, according to the present invention, provided is an image stabilization control method comprising: detecting a subject or subjects in an input image using a learned model and outputting subject information of the detected subject or subjects; tracking one detected subject in a plurality of images input consecutively; calculating reliability of the tracking based on the subject information; and calculating a first correction amount to be used for image stabilization by adjusting a provisional correction amount which is based on a difference between a position of the subject being tracked by the tracking unit and a predetermined target position in an image, according to the reliability.

Further, according to the present invention, provided is a non-transitory computer-readable storage medium, the storage medium storing a program that is executable by the computer, wherein the program includes program code for causing the computer to function as an image stabilization control apparatus comprising: a first detection unit that detects a subject or subjects in an input image using a learned model and outputs subject information of the detected subject or subjects; a tracking unit that tracks one subject detected by the first detection unit in a plurality of images input consecutively; a reliability calculation unit that calculates reliability of the tracking by the tracking unit based on the subject information; and a first correction amount calculation unit that calculates a first correction amount to be used for image stabilization by adjusting a provisional correction amount which is based on a difference between a position of the subject being tracked by the tracking unit and a predetermined target position in an image, according to the reliability.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
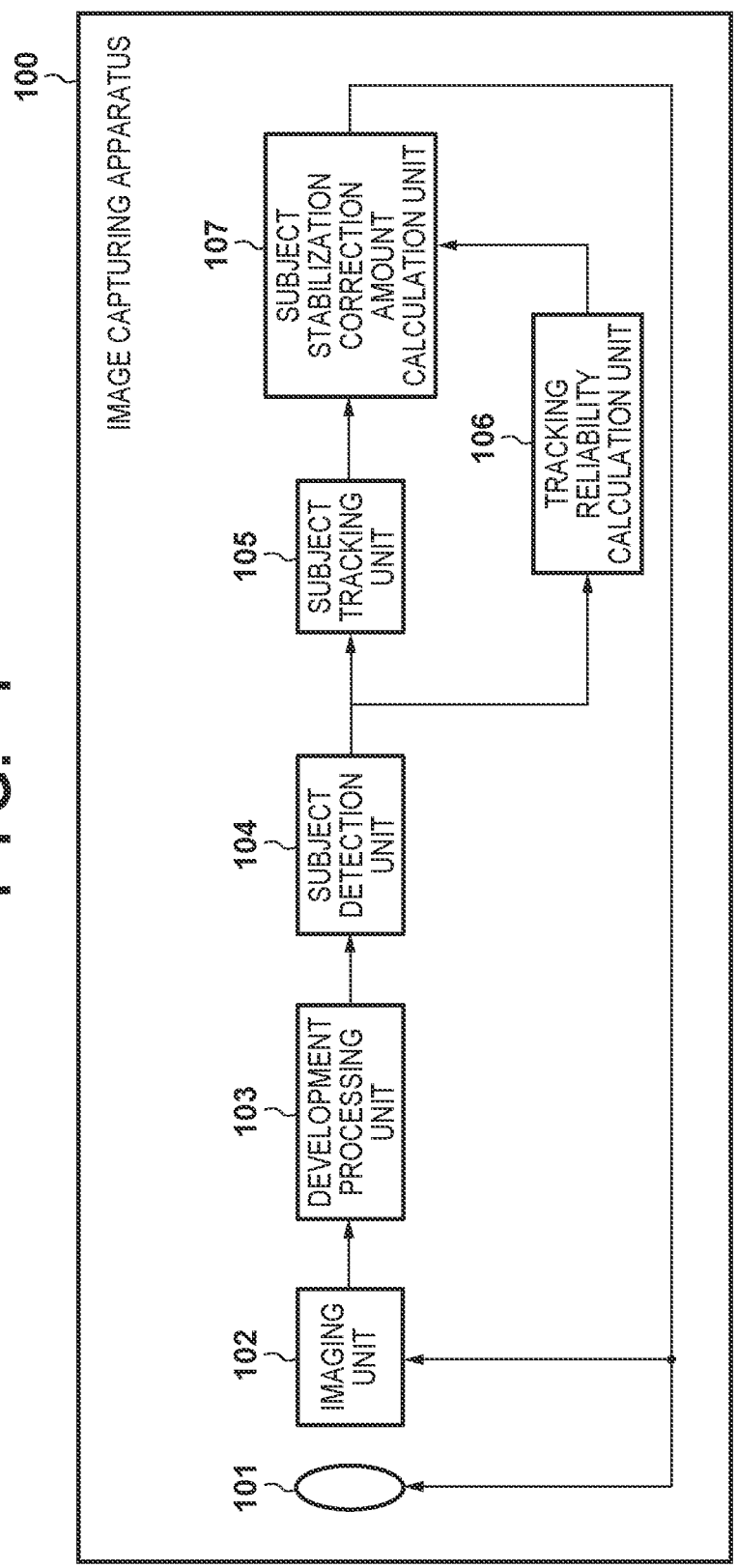
FIG. 1 is a block diagram illustrating a configuration of an image capturing apparatus according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing a configuration of an image capturing apparatus 100 having an image stabilization control apparatus according to a first embodiment of the present invention. An optical image of a subject formed by an optical system 101 including a plurality of lenses such as a focus lens, a zoom lens, and a correction lens for image stabilization, an aperture, and the like, is converted into an image signal by an imaging unit 102 including an image sensor such as a CMOS sensor or a CCD sensor, and output. Note that the optical system 101 may be configured to be detachable from the image capturing apparatus 100 as a lens unit. In that case, the image capturing apparatus 100 and the lens unit constitute an image capturing system. The image signal output from the imaging unit 102 undergoes development processing such as white balance processing, color (luminance/color difference signal) conversion, and γ correction in a development processing unit 103, and image data is output.

A subject detection unit 104 detects one or more subjects in the image data input from the development processing unit 103 using a learned model, and generates and outputs subject information about the detected subject or subjects. The subject information includes at least one of the position of each subject, the size of each subject, the type of each subject, and the number of detected subject or subjects. A subject tracking unit 105 tracks arbitrary one of the subject or subjects detected by the subject detection unit 104. A tracking reliability calculation unit 106 calculates the reliability of subject tracking by the subject tracking unit 105 based on the subject information obtained from the subject detection unit 104.

A subject stabilization correction amount calculation unit 107 calculates a subject stabilization correction amount using the position of the subject being tracked by the subject tracking unit 105 and a target position in the image.

Then, based on the subject stabilization correction amount calculated by the subject stabilization correction amount calculation unit 107, subject stabilization is performed so that the position of the subject approaches the target position. For the subject stabilization, a known method can be used; for example, an optical image stabilization that moves a correction lens (not shown) included in the optical system 101 or the image sensor included in the imaging unit 102 on a plane perpendicular to the optical axis may be used. Moreover, electronic image stabilization that crops partial image of the image data output from the imaging unit 102 while shifting the pixel positions of the image data based on the subject stabilization correction amount may be used, and it is also possible to use both optical image stabilization and electronic image stabilization in combination.

Next, subject image stabilization processing in the image capturing apparatus 100 having the configuration shown in FIG. 1 will be described using the flowchart shown in FIG. 2. Note that this processing is started, for example, in a case where subject image stabilization processing is instructed by an operation member (not shown) during displaying live view before still image shooting, or in a case where moving image shooting is instructed.

In step S201, the subject detection unit 104 detects one or more subjects in an image of the image data input from the development processing unit 103 using a learned model, and generates and outputs subject information of the detected subject or subjects.

In step S202, the subject tracking unit 105 tracks arbitrary one of the subject or subjects detected by the subject detection unit 104 in step S201. Tracking of the subject can be performed using known template matching with a partial image including the subject to be tracked as a template.

For the second and subsequent images, the subject that was tracked in the immediately preceding image is tracked, and for the first image, a subject to be tracked is selected. At this time, if a plurality of subjects are detected in step S201, the subject that is considered to be most important is selected. For example, the priority of the subject is higher if the size of the subject is larger, the position of the subject is closer to the center of the image, and reliability of subject detection of the subject is higher. Alternatively, the user may select the subject to be tracked.

If the subject to be tracked cannot be tracked in the second and subsequent images, another of the subjects detected in step S201 is selected and tracked.

Next, in step S203, the tracking reliability calculation unit 106 calculates the reliability of subject tracking performed by the subject tracking unit 105 in step S202 based on the subject information output from the subject detection unit 104 in step S201.

Figures 3, 4:
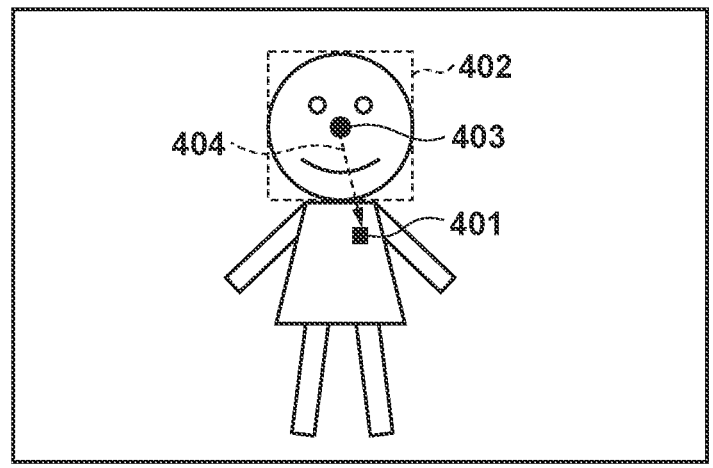
FIG. 3 is a diagram for explaining a method of calculating reliability of subject tracking according to the first embodiment.
FIG. 4 is a diagram for explaining a method of calculating a subject stabilization correction amount according to the first embodiment.

Here, an example of a method of calculating the reliability of subject tracking based on the subject information will be described with reference to FIG. 3. As described above, the subject information includes at least one of the position of each subject, the size of each subject, the type of each subject, and the number of detected subject or subjects. Information on the position of each subject can be used after being converted into the distance between the subjects if a plurality of subjects are detected. For example, it is considered that the shorter (closer) the distance between the subject to be tracked and the other subject or subjects, the higher the possibility that the subject transfer to the other subject will occur. Therefore, the tracking reliability calculation unit 106 lowers the reliability of subject tracking as the distance between subjects detected by the subject detection unit 104 is shorter, and increases the reliability of subject tracking as the distance is longer (farther).

Also, the smaller the size of the subject, the smaller the amount of subject information included in the template used during tracking by template matching, and the higher the possibility that the subject transfer to the other subject will occur. Therefore, the tracking reliability calculation unit 106 lowers the reliability of subject tracking as the size of the subject to be tracked is smaller, and increases the reliability of subject tracking as the size of the subject to be tracked is larger based on the information on the size of the subject.

The information on the type of subject can be used after being converted into the similarity between the types of subjects, for example. It is considered that the higher the similarity between the subject to be tracked and the type of other subject or subjects, the higher the possibility that the subject transfer to the other subject will occur. For example, if the subjects are of the same type, such as persons, animals, or vehicles, the more likely it is that the subject transfer will occur. In addition, compared to persons and vehicles, persons and animals have a higher similarity in type, and the more likely it is that the subject transfer will occur. Therefore, the tracking reliability calculation unit 106 lowers the reliability of subject tracking as the similarity between the types of subjects detected by the subject detection unit 104 is higher, and increases the reliability of subject tracking as the similarity is lower.

The similarity may be determined in advance according to the type of the detected subjects and stored. For example, if the detected subjects are persons, a high similarity (similarity score) is set, if a person and a vehicle are detected, a low similarity is set, and if a person and an animal are detected, the similarity is set so as to be lower than the similarity between persons and higher than the similarity between a person and a vehicle. If the species of animals can be identified, for example, a high similarity is set if cats are detected, a low similarity is set if a cat and a person are detected, and an even lower similarity is set if a cat and a non-living object such a vehicle are detected. Further, if a cat and a dog are detected, a similarity is set lower than a similarity when cats are detected and higher than a similarity when a cat and a person are detected. The same applies to other animals.

Also, in a case where three or more subjects are detected, the highest similarity among them is adopted. For example, if one person, one dog, and one train are detected, the similarity between the person and the dog is adopted.

In addition, it is considered that the greater the number of detected subjects, the higher the possibility that the subject transfer to another subject will occur in subject tracking. Therefore, the tracking reliability calculation unit 106 sets a lower reliability of subject tracking as the number of subjects detected by the subject detection unit 104 is larger, and sets a higher reliability of subject tracking as the number of detected subjects is smaller, based on the information on the number of subject or subjects.

As described above, the reliability of subject tracking can be obtained based on each type of subject information. As the final reliability of subject tracking, a threshold value may be set for each type of subject information, and the reliability may be digitized into discrete numerical values and a weighted average of the values may be obtained. Alternatively, a reliability with high priority may be adopted.

The above method can be combined with a known method of calculating the reliability of subject tracking from the distribution of evaluation values (SAD values) obtained by template matching and the distribution of characteristic colors of the subject area. In this case, the weighted average of the reliabilities of subject tracking calculated by the respective methods may be taken, or the one with the higher priority may be adopted as the final reliability of subject tracking.

In step S204, the subject stabilization correction amount calculation unit 107 first calculates the subject stabilization correction amount using the position of the subject being tracked by the subject tracking unit 105 in step S202 and the target position in the image. Then, in step S203, the subject stabilization correction amount is adjusted based on the reliability of subject tracking calculated by the tracking reliability calculation unit 106. Here, a method for calculating the subject stabilization correction amount will be described with reference to FIG. 4.

A black square 401 indicates the target position in the image and can be set to any position. In the example of FIG. 4, it is set at the center of the imaging screen. A rectangle 402 indicated by a dotted line indicates the area of the subject detected in step S201, and a black circle 403 indicates the position of the center of gravity of the area of the subject. An arrow 404 indicates the difference between the coordinates 401 and 403, and this difference is the provisional subject stabilization correction amount.

In addition, it is common for there to be an error in the position of the detected subject due to the noise of the image and the accuracy of the subject detection. Therefore, it is desirable to apply a low-pass filter (LPF) to the position of the subject or the subject stabilization correction amount, and use the low frequency component as a provisional subject stabilization correction amount.

Next, the provisional subject stabilization correction amount is adjusted in consideration of the reliability of subject tracking, and the final subject stabilization correction amount is calculated. If the reliability of subject tracking is low, there is a possibility of erroneous detection of the subject or subject transfer. Therefore, the subject stabilization correction amount calculation unit 107 adjusts so that the subject stabilization correction amount becomes smaller as the subject tracking reliability becomes lower. Note that the adjustment of the subject stabilization correction amount may be performed step by step by setting a threshold or thresholds for determining the reliability.

There are several possible methods to reduce the subject stabilization correction amount. For example, as the reliability of subject tracking is lower, a method of multiplying a gain that makes the subject stabilization correction amount smaller, a method of setting a lower cutoff frequency to the LPF for the subject stabilization correction amount, and a method of setting the upper limit of subject stabilization correction amount between images lower may be considered.

As described above, the subject stabilization correction amount is calculated based on the reliability of subject tracking.

In step S205, subject image stabilization is performed based on the subject stabilization correction amount calculated by the subject stabilization correction amount calculation unit 107 in step S204. Then, in step S206, it is determined whether or not to end the subject image stabilization processing. Here, for example, it is determined whether or not an instruction to end the subject image stabilization processing or to end moving image shooting has been issued using an operation member (not shown). If the subject image stabilization processing is to be continued, the process returns to step S201, and the above processes are repeated for the image of the image data input next. On the other hand, if the subject image stabilization processing is to be ended, the processing is ended.

With the above-described processing, it is possible to accurately determine erroneous detection of a subject or subject transfer in a plurality of images captured in succession, and the subject image stabilization processing can be performed without impairing the image quality.

Figure 2:
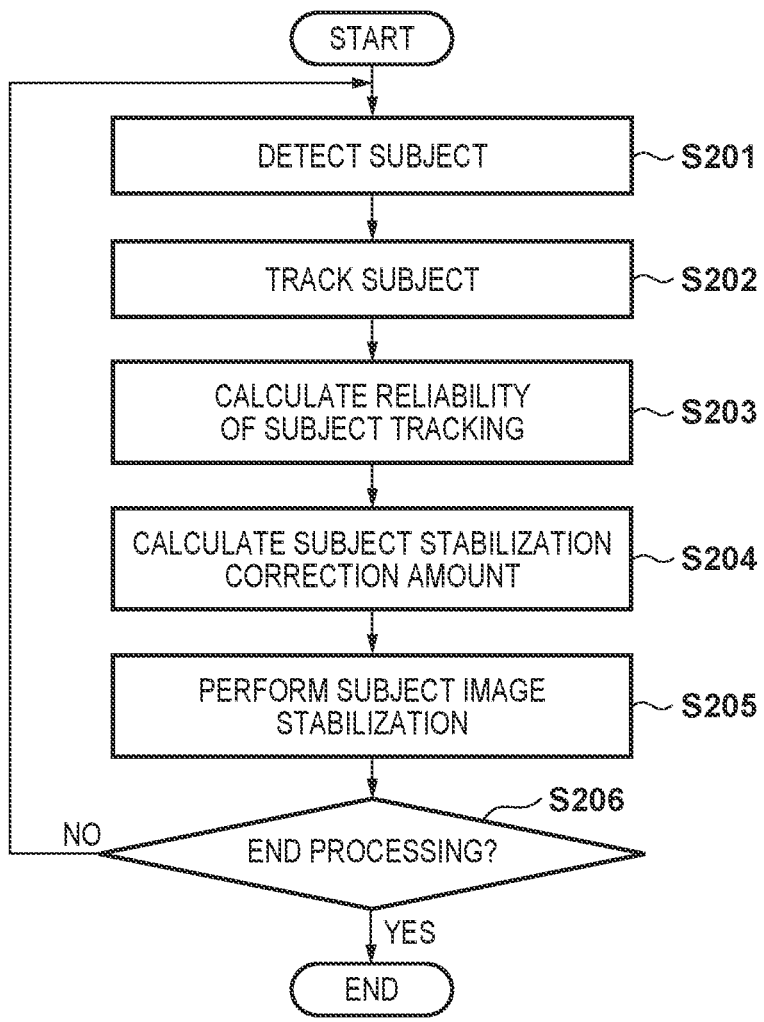
FIG. 2 is a flowchart for explaining subject image stabilization processing according to the first embodiment.

The subject image stabilization processing shown in FIG. 2 can be performed in real time by the image capturing apparatus 100 during shooting. Alternately, in a case where a moving image is captured, it is possible to perform the subject image stabilization processing during playing back the moving image by performing an electronic image stabilization.

For example, a captured moving image is recorded in a recording unit (not shown), and the subject image stabilization processing is performed during playback of the moving image by performing the processing of steps S201 to S206 on each frame image of the recorded moving image. Further, when recording a moving image, subject information generated by the subject detection unit 104 may be recorded in addition to the captured moving image so that subject detection is not required during playback of the moving image.

Second Embodiment

Next, a second embodiment of the present invention will be described.

In the first embodiment, only the blurring of the subject was treated as the target of image stabilization, but in the present embodiment, image stabilization is performed in consideration of camera shake as well.

Figure 5:
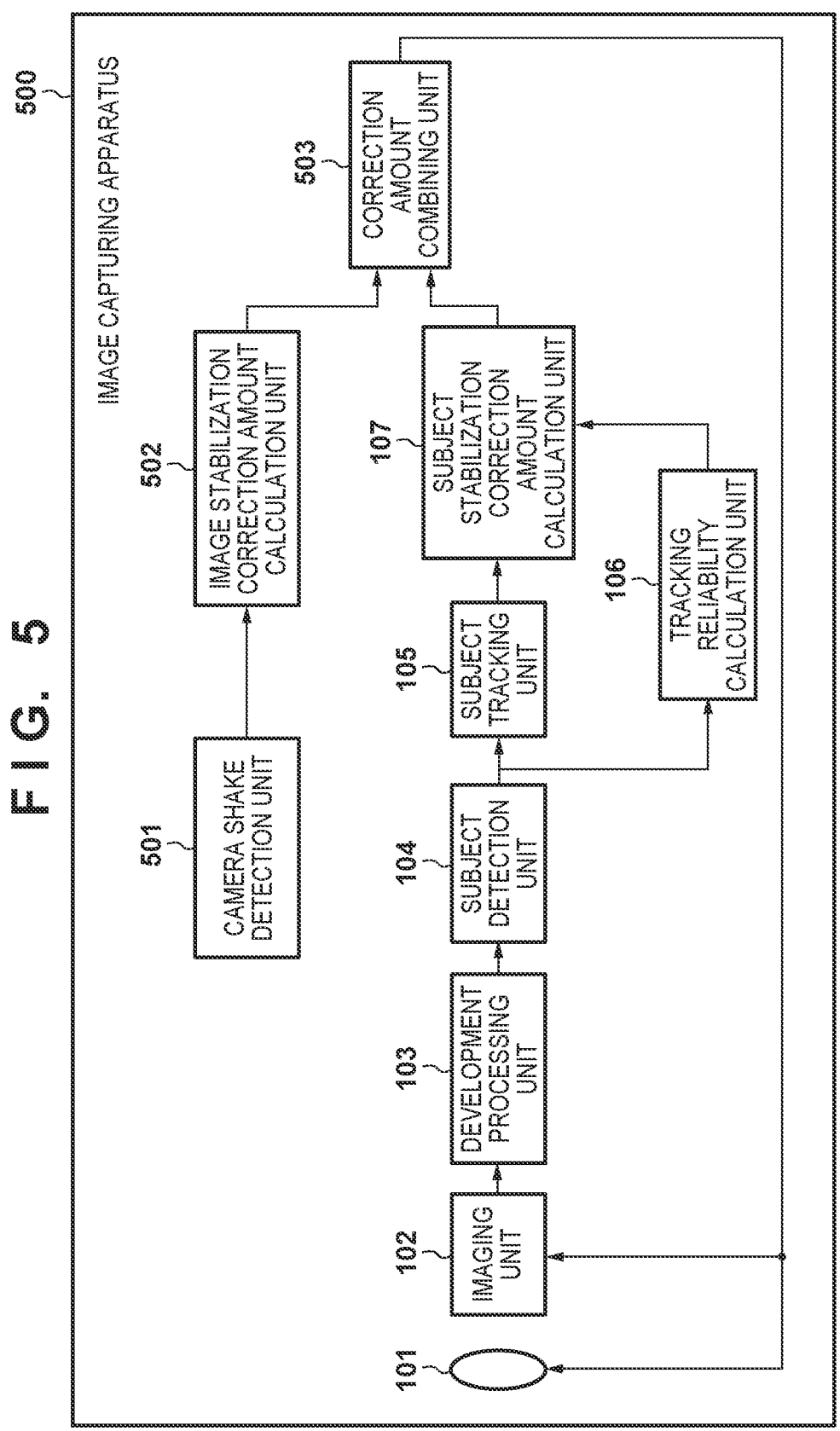
FIG. 5 is a block diagram illustrating a configuration of an image capturing apparatus according to a second embodiment.

FIG. 5 is a block diagram showing the configuration of an image capturing apparatus 500 having an image stabilization control apparatus according to the second embodiment of the present invention. In addition, in FIG. 5, the same reference numerals as in FIG. 1 are assigned to the same components as those shown in FIG. 1, and the description thereof is omitted. The image capturing apparatus 500 of this embodiment has a camera shake detection unit 501, an image stabilization correction amount calculation unit 502, and a correction amount combining unit 503 in addition to the configuration shown in FIG. 1.

A camera shake detection unit 501 detects camera shake applied to the image capturing apparatus 500. A gyro sensor, for example, may be used as the camera shake detection unit 501, however, the camera shake detection unit is not limited to this. An image stabilization correction amount calculation unit 502 calculates an image stabilization correction amount for correcting camera shake detected by the camera shake detection unit 501. The correction amount combining unit 503 combines the subject stabilization correction amount output from the subject stabilization correction amount calculation unit 107 and the image stabilization correction amount output from the image stabilization correction amount calculation unit 502 to obtain the final image stabilization correction amount (composite correction amount).

Figure 6:
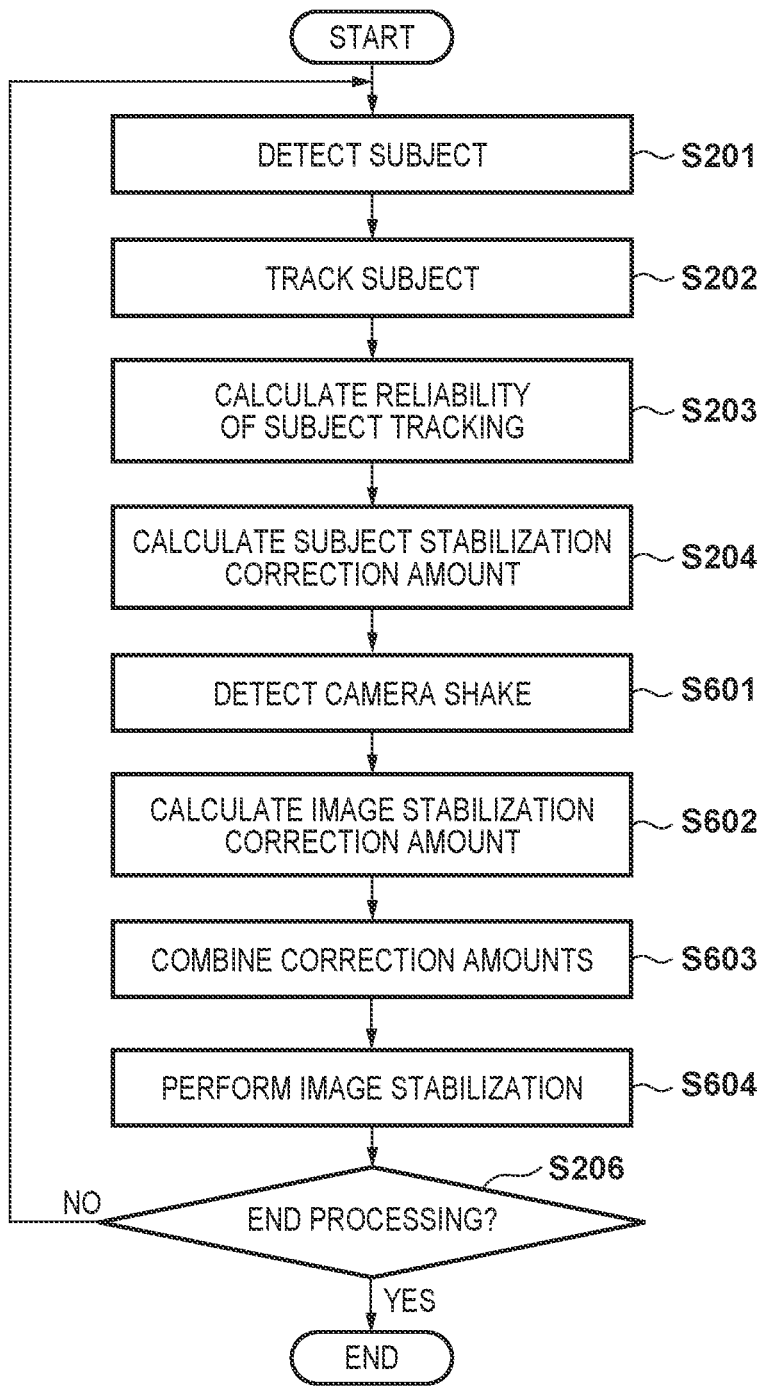
FIG. 6 is a flowchart for explaining image stabilization processing according to the second embodiment.

FIG. 6 is a flowchart showing an image stabilization processing in the second embodiment. In FIG. 6, steps common to those shown in FIG. 2 are denoted by the same reference numerals as in FIG. 2, and description thereof is omitted.

After the subject stabilization correction amount calculation unit 107 calculates the subject stabilization correction amount in step S204, the process proceeds to step S601.

In step S601, the camera shake detection unit 501 detects camera shake applied to the image capturing apparatus 500. Note that the timing of executing the process of step S601 may be anytime before step S602, and may be before or after each of steps S201 to S204, or may be executed in parallel with steps S201 to S204.

In step S602, the image stabilization correction amount calculation unit 502 calculates the image stabilization correction amount for correcting the camera shake detected in step S601. For example, if the camera shake detection unit 501 is a gyro sensor, the image stabilization correction amount can be calculated by integrating the obtained angular velocity signal of camera shake and inverting the sign.

In step S603, the correction amount combining unit 503 combines the subject stabilization correction amount obtained in step S204 and the image stabilization correction amount obtained in step S602 to calculate the final image stabilization correction amount (composite correction amount). At this time, it is preferable to dynamically change the combining ratio (weight) of the subject stabilization correction amount and the image stabilization correction amount according to the reliability of subject tracking calculated by the tracking reliability calculation unit 106 in step S203.

As a combining method, for example, there is a method of combining the correction amounts by frequency. Specifically, an LPF is applied to the subject stabilization correction amount to extract low frequency component. On the other hand, a high-pass filter (HPF) is applied to the image stabilization correction amount to extract high frequency component. The low frequency component of the subject stabilization correction amount and the high frequency component of the image stabilization correction amount obtained in this manner are combined by weighted addition based on the reliability of subject tracking.

Here, weight control can be performed by substantially matching the cutoff frequencies of the LPF and HPF and then changing the cutoff frequencies according to the reliability of subject tracking. Specifically, the lower the reliability of subject tracking, the lower the cutoff frequencies of the LPF and HPF, thereby reducing the weight of the low frequency component of the subject stabilization correction amount and increasing the weight of the high frequency component of the image stabilization correction amount.

In step S604, image stabilization is performed based on the final image stabilization correction amount obtained in step S603. Also in this case, as an image stabilization method, optical image stabilization, electronic image stabilization, or a combination thereof may be considered as in the first embodiment.

As described above, according to the second embodiment, it is possible to accurately determine erroneous detection of a subject or subject transfer, and subject image stabilization and image stabilization can be performed without impairing the image quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041765, filed Mar. 16, 2022 which is hereby incorporated by reference herein in its entirety.

What is claimed is:

1. An image stabilization control apparatus comprising one or more processors and/or circuitry which function as:
a first detection unit that detects a subject or subjects in an input image using a learned model and outputs subject information of the detected subject or subjects;
a tracking unit that tracks one subject detected by the first detection unit in a plurality of images input consecutively;
a reliability calculation unit that calculates reliability of the tracking by the tracking unit based on the subject information; and
a first correction amount calculation unit that calculates a first correction amount to be used for image stabilization by adjusting a provisional correction amount which is based on a difference between a position of the subject being tracked by the tracking unit and a predetermined target position in an image, according to the reliability,
wherein the subject information includes at least one of a position, size, type of each subject detected by the first detection unit, and a number of the subject or subjects detected by the first detection unit, and
wherein, in a case where the reliability calculation unit detects a plurality of subjects, the reliability calculation unit lowers the reliability more in a case where a distance between the plurality of subjects is a first distance than in a case where the distance is a second distance longer than the first distance.

2. The image stabilization control apparatus according to claim 1, wherein the tracking unit tracks the subject by template matching.

3. The image stabilization control apparatus according to claim 1, wherein the reliability calculation unit lowers the reliability more in a case where a size of the subject being tracked by the tracking unit is a first size than in a case where the size is a second size larger than the first size.

4. The image stabilization control apparatus according to claim 1, wherein the reliability calculation unit lowers the reliability more in a case where a number of subjects detected by the first detection unit is a first number than in a case where a number of subject or subjects detected by the first detection unit is a second number that is smaller than the first number.

5. The image stabilization control apparatus according to claim 1, wherein the first correction amount calculation unit adjusts the provisional correction amount so as to be smaller in a case where the reliability is a first reliability than in a case where the reliability is a second reliability that is higher than the first reliability.

6. The image stabilization control apparatus according to claim 5, wherein the first correction amount calculation unit applies a gain to the provisional correction amount, the gain is to make the provisional correction amount becomes smaller in a case where the reliability is the first reliability than in a case where the reliability is the second reliability.

7. The image stabilization control apparatus according to claim 1, wherein the one or more processors and/or circuitry further function as an electronic image stabilization unit that performs electronic image stabilization so as to make the position of the subject being tracked by the tracking unit approach the target position.

8. The image stabilization control apparatus according to claim 1, wherein the one or more processors and/or circuitry further function as:
- a second detection unit that detects camera shake applied to an imaging unit that captured the input image;
- a second calculation unit that calculates a second correction amount to be used for cancelling the camera shake detected by the second detection unit; and
- a combining unit that calculates a composite correction amount to be used for image stabilization by combining the first correction amount and the second correction amount.

9. An image stabilization control apparatus comprising one or more processors and/or circuitry which function as:
- a first detection unit that detects a subject or subjects in an input image using a learned model and outputs subject information of the detected subject or subjects;
- a tracking unit that tracks one subject detected by the first detection unit in a plurality of images input consecutively;
- a reliability calculation unit that calculates reliability of the tracking by the tracking unit based on the subject information; and
- a first correction amount calculation unit that calculates a first correction amount to be used for image stabilization by adjusting a provisional correction amount which is based on a difference between a position of the subject being tracked by the tracking unit and a predetermined target position in an image, according to the reliability,
- wherein the subject information includes at least one of a position, size, type of each subject detected by the first detection unit, and a number of the subject or subjects detected by the first detection unit, and
- wherein, in a case where the first detection unit detects a plurality of subjects, the reliability calculation unit lowers the reliability more as similarity between a type of the subject being tracked by the tracking unit and a type of another subject is higher.

10. An image stabilization control apparatus comprising one or more processors and/or circuitry which function as:
- a first detection unit that detects a subject or subjects in an input image using a learned model and outputs subject information of the detected subject or subjects;
- a tracking unit that tracks one subject detected by the first detection unit in a plurality of images input consecutively;
- a reliability calculation unit that calculates reliability of the tracking by the tracking unit based on the subject information; and
- a first correction amount calculation unit that calculates a first correction amount to be used for image stabilization by adjusting a provisional correction amount which is based on a difference between a position of the subject being tracked by the tracking unit and a predetermined target position in an image, according to the reliability,
- wherein the first correction amount calculation unit adjusts the provisional correction amount so as to be smaller in a case where the reliability is a first reliability than in a case where the reliability is a second reliability that is higher than the first reliability, and
- wherein the first correction amount calculation unit lowers a cutoff frequency of a low-pass filter applied to the provisional correction amount more in a case where the reliability is the first reliability than in a case where the reliability is the second reliability.

11. An image stabilization control apparatus comprising one or more processors and/or circuitry which function as:
- a first detection unit that detects a subject or subjects in an input image using a learned model and outputs subject information of the detected subject or subjects;
- a tracking unit that tracks one subject detected by the first detection unit in a plurality of images input consecutively;
- a reliability calculation unit that calculates reliability of the tracking by the tracking unit based on the subject information; and
- a first correction amount calculation unit that calculates a first correction amount to be used for image stabilization by adjusting a provisional correction amount which is based on a difference between a position of the subject being tracked by the tracking unit and a predetermined target position in an image, according to the reliability,
- wherein the first correction amount calculation unit adjusts the provisional correction amount so as to be smaller in a case where the reliability is a first reliability than in a case where the reliability is a second reliability that is higher than the first reliability, and
- wherein the first correction amount calculation unit lowers an upper limit of the first correction amount more in a case where the reliability is the first reliability than in a case where the reliability is the second reliability.

12. An image stabilization control apparatus comprising one or more processors and/or circuitry which function as:
- a first detection unit that detects a subject or subjects in an input image using a learned model and outputs subject information of the detected subject or subjects;
- a tracking unit that tracks one subject detected by the first detection unit in a plurality of images input consecutively;
- a reliability calculation unit that calculates reliability of the tracking by the tracking unit based on the subject information;
- a first correction amount calculation unit that calculates a first correction amount to be used for image stabilization by adjusting a provisional correction amount which is based on a difference between a position of the subject being tracked by the tracking unit and a predetermined target position in an image, according to the reliability;
- a second detection unit that detects camera shake applied to an imaging unit that captured the input image;
- a second calculation unit that calculates a second correction amount to be used for cancelling the camera shake detected by the second detection unit; and
- a combining unit that calculates a composite correction amount to be used for image stabilization by combining the first correction amount and the second correction amount,
- wherein the combining unit combines the first correction amount and the second correction amount using weights based on the reliability, and
- wherein the combining unit performs weighted addition on low frequency component of the first correction amount and high frequency component of the second correction amount based on the reliability.

13. The image stabilization control apparatus according to claim 12, wherein the combining unit reduces a weight of the low frequency component of the first correction amount more and increases a weight of high frequency component of the second correction amount more as the reliability is lower.

14. The image stabilization control apparatus according to claim 12, wherein the one or more processors and/or circuitry further function as an electronic image stabilization unit that performs electronic image stabilization so as to make the position of the subject being tracked by the tracking unit approach the target position based on the composite correction amount.

15. An image stabilization control method comprising:
- detecting a subject or subjects in an input image using a learned model and outputting subject information of the detected subject or subjects;
- tracking one detected subject in a plurality of images input consecutively;
- calculating reliability of the tracking based on the subject information; and
- calculating a first correction amount to be used for image stabilization by adjusting a provisional correction amount which is based on a difference between a position of the subject being tracked and a predetermined target position in an image, according to the reliability,
- wherein the subject information includes at least one of a position, size, type of each subject detected in the detecting, and a number of the subject or subjects detected in the detecting, and
- wherein, in a case where a plurality of subjects is detected in the calculating reliability, the reliability is lowered more in a case where a distance between the plurality of subjects is a first distance than in a case where the distance is a second distance longer than the first distance.

16. The image stabilization control method according to claim 15, further comprising:
- detecting camera shake applied to an imaging unit that captured the input image;
- calculating a second correction amount to be used for cancelling the detected camera shake; and
- calculating a composite correction amount to be used for image stabilization by combining the first correction amount and the second correction amount.

17. A non-transitory computer-readable storage medium, the storage medium storing a program that is executable by the computer, wherein the program includes program code for causing the computer to function as an image stabilization control apparatus comprising:
- a first detection unit that detects a subject or subjects in an input image using a learned model and outputs subject information of the detected subject or subjects;
- a tracking unit that tracks one subject detected by the first detection unit in a plurality of images input consecutively;
- a reliability calculation unit that calculates reliability of the tracking by the tracking unit based on the subject information; and
- a first correction amount calculation unit that calculates a first correction amount to be used for image stabilization by adjusting a provisional correction amount which is based on a difference between a position of the subject being tracked by the tracking unit and a predetermined target position in an image, according to the reliability,
- wherein the subject information includes at least one of a position, size, type of each subject detected by the first detection unit, and a number of the subject or subjects detected by the first detection unit, and
- wherein, in a case where the reliability calculation unit detects a plurality of subjects, the reliability calculation unit lowers the reliability more in a case where a distance between the plurality of subjects is a first distance than in a case where the distance is a second distance longer than the first distance.

* * * * *